UNITED STATES PATENT OFFICE.

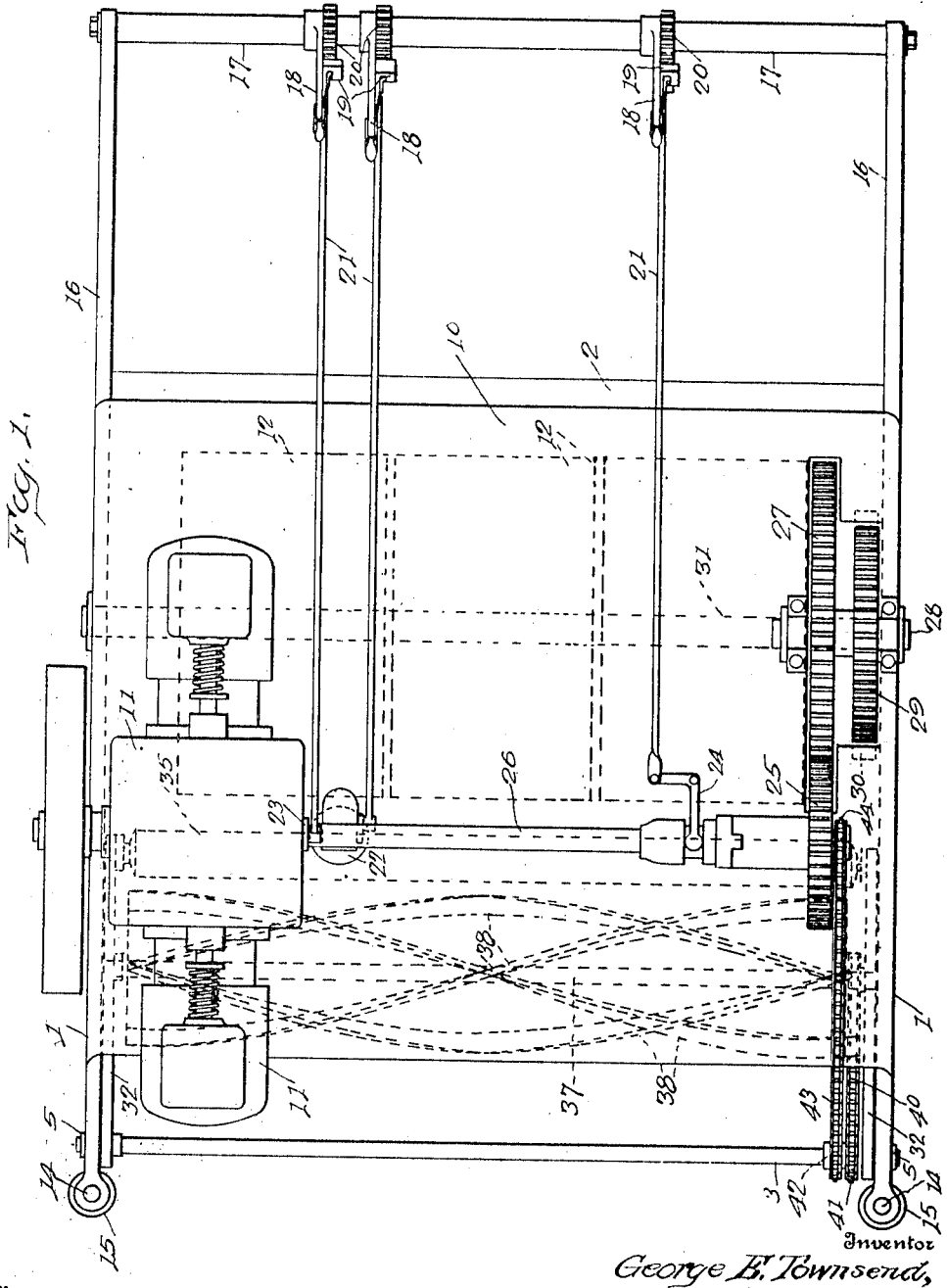

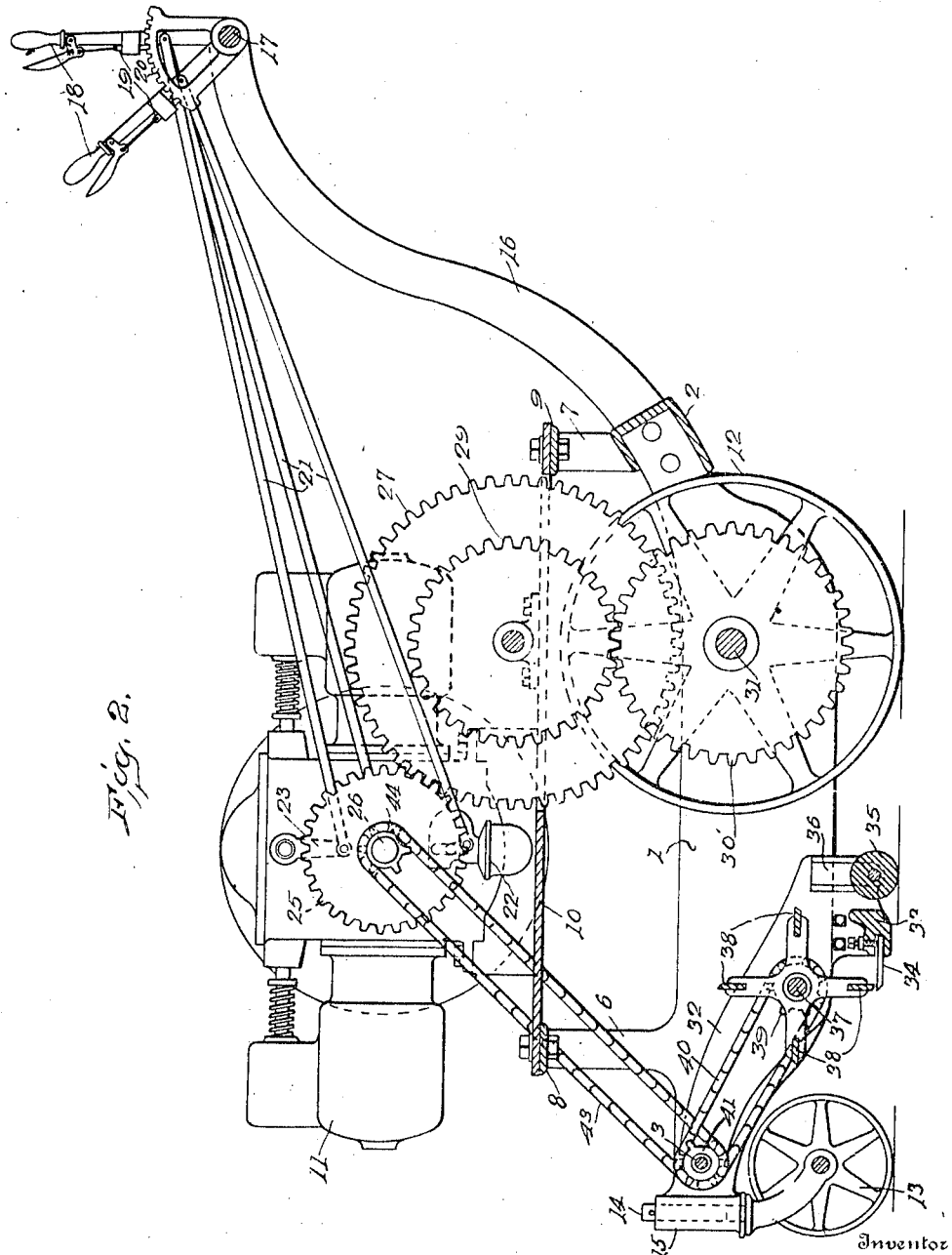

GEORGE E. TOWNSEND, OF SPRINGFIELD, OHIO.

LAWN-MOWER.

991,910.  Specification of Letters Patent.  Patented May 9, 1911.

Application filed January 31, 1910. Serial No. 540,981.

*To all whom it may concern:*

Be it known that I, GEORGE E. TOWNSEND, a citizen of the United States, residing at Springfield, in the county of Clark and State of Ohio, have invented certain new and useful Improvements in Lawn-Mowers, of which the following is a specification, reference being had therein to the accompanying drawings.
This invention relates to lawn-mowers, and more particularly to power-driven lawn-mowers.

The object of the invention is to provide a power-driven lawn-mower which can be steered and the power mechanism controlled by an operator walking in the rear of the machine.

A further object of the invention is to provide an automatically adjustable support for the cutting mechanism, whereby this mechanism will accommodate itself to the irregularities in the ground, regardless of the position of the main frame.

In the accompanying drawings, Figure 1 is a top plan view of a lawn-mower embodying my invention; and Fig. 2 is a longitudinal, sectional view, taken vertically through such a machine.

In these drawings I have illustrated one embodiment of my invention and have shown the same as comprising a main frame consisting of side members 1 which are connected at their rear ends by a transverse member 2 and at their forward ends by a shaft 3 which is mounted in suitable openings formed in the side members 1 and has suitable stops, such as shoulders 5 to hold the same against longitudinal movement relatively to these side members. The side members 1 have upwardly projecting parts, such as arms 6 and 7, which are connected by transverse bars 8 and 9. A supporting deck or platform 10 is mounted on these upwardly extending portions of the main frame and their connecting members and on this supporting-deck is mounted an explosive engine 11 which may be of any suitable type and is here shown as a double opposed explosive engine of ordinary construction. The rear portion of the main frame is supported on suitable ground wheels 12, which, in the present instance, are of such a construction and are so arranged as to constitute a ground roller. The forward end of the frame is supported by caster-wheels 13 carried by standards or vertical spindles 14 which are journaled in vertical bearings 15 carried by the main frame near the forward corners thereof. The ground wheels 12 are actuated from the engine 11 in any desirable manner. In the present instance a train of gearing is employed for this purpose and comprises a gear 25 mounted on a shaft 26 of the engine and meshing with a gear 27 carried by a countershaft 28 mounted on the supporting-deck 10 and having secured thereto a second gear 29, which, in turn, meshes with a gear 30 carried by the shaft 31 upon which the ground wheels 12 are mounted. Rigidly secured to and extending rearwardly and upwardly from the main frame are suitable steering handles 16. In the present instance one of these handles is secured to the main frame on each side thereof and the handles are connected at their outer ends by a cross bar 17. Supported by the steering handles is suitable controlling mechanism which is operatively connected to the several controlling parts of the engine 11. As here shown this controlling mechanism comprises a plurality of levers 18 mounted on the cross bar 17 and having locking dogs 19 adapted to engage the respective segments 20 which are also mounted on the cross bar 17. These levers are connected by any suitable means, such as the rods 21, with the controlling parts of the engine. In the present machine one lever is connected with the throttle lever 22 which controls the carbureter, another with the timing lever 23 for timing the spark and the third with the lever 24 which controls the transmission mechanism. These several parts of the controlling mechanism are of ordinary construction and it is, not necessary that the same should be here shown or described in detail and I have, therefore, only shown the same in conventional form. It will be obvious that the character of the parts controlled and of the controlling mechanism is immaterial, the essential feature being that the controlling mechanism is supported by the steering handles and is operatively connected with the controlling 105 parts of the engine, thereby enabling the operator to walk in the rear of the machine, as in case of an ordinary lawn-mower, guide the machine over the ground and control the operation of the engine.

Cutting mechanism is supported between the side members of the main frame in front of the ground wheels 12. This mechanism is, in the present instance, automatically adjustable and, to this end, I have shown the same as supported by a frame comprising two side members 32 pivotally mounted at their forward ends upon the shaft 3 and connected at their rear ends by a transverse member 33 on which is mounted a cutter bar 34. The rear end of this frame is supported by a ground roller 35 which is connected thereto in the rear of the cutter bar 34. This ground roller is preferably made adjustable by journaling the same in plates 36 which are adjustably mounted on the rear ends of the side members 32. A shaft 37 carrying the revolving cutters 38 is journaled in the frame members 32 in such a position that the revolving cutters will coöperate with the cutter bar 34. The cutter shaft 37 has secured thereto a sprocket wheel 39 which is connected by means of a sprocket chain 40 with a second sprocket wheel 41 on the shaft 3, this shaft, in turn, having a sprocket wheel 42 which is connected by a sprocket chain 43 with a sprocket wheel 44 on the engine shaft 26.

While the shaft and sprocket wheels carried thereby may be of any suitable character I prefer to rigidly mount the shaft 3 in the side members of the main frame and to form the sprocket wheels 41 and 42 as a double sprocket wheel journaled on the shaft 3.

It will be noted that the supporting frame 32 is pivoted on the shaft 31 which is the driving shaft for the cutter mechanism, and, consequently, this frame is free to move about this shaft without affecting the driving chain 40. Therefore, as the machine moves over the ground the roller 35 will follow irregularities in the ground and maintain the cutter mechanism, to which it is closely located and rigidly connected, at the proper distance from the ground, regardless of the position of the caster-wheels or of the main frame. In this manner I have overcome the difficulty heretofore almost invariably encountered in power-driven machines, namely, that the position of the cutter mechanism was controlled by the supporting wheels for the main frame, and, as these wheels were necessarily removed some distance from the cutter mechanism, the cutter mechanism would not follow the irregularities in the ground, and, as the supporting wheels for the frame followed these irregularities, the cutter mechanism would either be too high to properly cut the grass or would be so low as to cut into the ground. It will be readily apparent, however, that this cannot happen with a floating cutting mechanism such as herein shown and described.

By mounting the cutting mechanism in the rear of the pivotal center of the supporting frame a forward pull is exerted on the cutting mechanism and this forward pull has a slightly upward tendency, as distinguished from the forward and downward thrust exerted on the cutting mechanism when it is mounted in front of the pivotal center of the supporting frame. In this manner I further overcome the tendency of the machine to force the cutter into the ground. Further, it will be apparent that, by means of the controlling mechanism mounted on the steering handles of the machine, I am enabled to control the movement of the machine with an ease and certainty which is not possible with a machine which must be either steered or controlled, or both, from a point above or alongside of the main frame; and also that by reason of the arrangement of the steering handles and controlling mechanism, together with the automatically adjustable cutter mechanism, it is possible to manipulate the machine in such a manner as to cut the grass in places inaccessible to ordinary power-driven machines, such as close along the side of a fence, about shrubbery or along the edges of ditches and the like; and further, that the machine can be used on ground of a very uneven character which would entirely prohibit the use of an ordinary power-driven machine owing to the tendency of the cutting mechanism to cut into the ground.

While I have herein shown and described one form of my machine it will be apparent that many changes in the construction of the same may be made without departing from the principle of my invention and I, therefore, wish it to be understood that I do not desire to be limited to the details of construction shown and described, for obvious modifications will occur to a person skilled in the art.

Having thus fully described my invention, what I claim as new and desire to secure by Letters Patent, is:—

1. In a lawn mower, the combination, with a main frame, ground wheels therefor, and means for propelling said main frame, of a supporting frame pivotally connected directly to a fixed part carried by said main frame, cutting mechanism carried by said supporting frame in the rear of its pivotal connection to said main frame, and ground engaging means carried by said supporting frame to maintain said cutting mechanism at a uniform distance from the ground.

2. In a lawn mower, the combination, with a main frame, ground wheels therefor, and means for propelling said main frame, of a supporting frame pivotally connected directly to a fixed part carried by said main frame, cutting mechanism carried by said supporting frame in the rear of its pivotal connection to said main frame, and ground engaging means carried by said supporting frame in the rear of said cutting mechanism to maintain said cutting mechanism at a uniform distance from the ground.

3. In a lawn mower, the combination, with a main frame, ground wheels therefor, and means for propelling said main frame, of a supporting frame pivotally connected directly to a fixed part carried by said main frame, cutting mechanism carried by said supporting frame in the rear of its pivotal connection to said main frame, and a ground engaging roller carried by said supporting frame adjacent to said cutting mechanism.

4. In a lawn mower, the combination, with a main frame, ground wheels therefor, and an engine mounted on said main frame, of a supporting frame pivotally connected to said main frame and freely movable about its point of connection thereto, a rotatable driving member supported by said main frame with its axis of rotation coincident with the pivotal center of said supporting frame, means for operatively connecting said driving member with said engine, cutting mechanism carried by said supporting frame in the rear of its pivotal connection to said main frame, and an actuating member carried by said supporting frame and operatively connected with said cutting mechanism and with said driving member.

5. In a lawn mower, the combination, with a main frame, ground wheels therefor, and an engine mounted on said main frame, of a shaft mounted on said main frame, a supporting frame connected with said shaft and having free pivotal movement about the axis thereof, cutting mechanism carried by said supporting frame in the rear of its point of connection to said shaft, means for maintaining said cutting mechanism at a uniform distance from the ground, a sprocket wheel carried by said supporting frame and connected with said cutting mechanism, a second sprocket wheel mounted on said shaft, a sprocket chain passing about said sprocket wheels, and means for driving said second sprocket wheel from said engine.

6. In a lawn mower, the combination, with a main frame, ground wheels therefor, and an engine mounted on said main frame, of a shaft mounted on said main frame, a supporting frame connected to said shaft, extending rearwardly therefrom and having pivotal movement about the longitudinal axis thereof, cutting mechanism carried by said supporting frame, means for maintaining said cutting mechanism at a uniform distance from the ground, a sprocket wheel carried by said supporting frame and connected with said cutting mechanism, a second sprocket wheel mounted on said shaft, a sprocket chain passing about said sprocket wheels, and means for driving said second sprocket wheel from said engine.

7. In a lawn-mower, the combination, with a frame, ground wheels therefor, an engine mounted on said frame, steering handles secured to said frame, and controlling mechanism for said engine supported by said steering handles, of a supporting frame pivotally mounted on the first-mentioned frame, cutting mechanism carried by said supporting frame in the rear of its pivotal center, and means for driving said cutting mechanism from said engine.

8. In a lawn-mover, the combination, with a frame, ground wheels therefor, an engine mounted on said frame, steering handles secured to said frame, and controlling mechanism for said engine supported by said steering handles, of a shaft mounted in said frame, a supporting frame pivotally mounted on said shaft, cutter mechanism carried by said supporting frame in the rear of its point of connection to said shaft, a roller secured to said supporting frame at a point near said cutting mechanism, and means for driving said cutting mechanism from said engine.

9. In a lawn mower, the combination, with a frame, ground wheels therefor, an engine mounted on said frame, steering handles secured to said frame, and controlling mechanism for said engine supported by said steering handles, of a shaft journaled in said frame, a supporting frame pivotally mounted on said shaft, a cutter bar carried by said supporting frame in the rear of said shaft, a cutter shaft journaled in said supporting frame, revolving cutter blades carried by said cutter shaft, a ground roller carried by said supporting frame at a point adjacent to said cutter bar, a sprocket wheel carried by said cutter shaft, a second sprocket wheel mounted on the first-mentioned shaft, a sprocket chain connecting said sprocket wheels, and means for driving said first-mentioned shaft from said engine.

10. In a lawn-mower, the combination, with a main frame, ground wheels supporting the rear portion of said main frame, caster-wheels supporting the front portion of said main frame, steering handles extending rearwardly from said main frame, an explosive engine mounted on said main frame, a train of gearing connecting said engine with said ground wheels, controlling levers supported by said steering handles, and means for operatively connecting said controlling levers with said engine, of a shaft mounted in the forward portion of said main frame, means for connecting said shaft to said engine, a supporting frame pivotally mounted on said shaft, cutting mechanism mounted on said supporting frame, a ground roller carried by said supporting frame, and means for actuating said cutting mechanism from said shaft.

In testimony whereof, I affix my signature in presence of two witnesses.

GEORGE E. TOWNSEND.

Witnesses:
A. C. LINK,
EDWARD L. REED.